UNITED STATES PATENT OFFICE.

HUGO BREMER, OF NEHEIM, GERMANY.

ELECTRODE FOR ARC-LAMPS.

SPECIFICATION forming part of Letters Patent No. 710,943, dated October 14, 1902.

Application filed March 3, 1900. Serial No. 7,226. (No specimens.)

*To all whom it may concern:*

Be it known that I, HUGO BREMER, a subject of the German Emperor, residing at Neheim-on-the-Ruhr, Germany, have invented certain new and useful Improvements in Electrodes for Arc-Lamps, of which the following is a full and exact specification.

My invention relates to the construction and composition of electrodes for arc-lamps; and the purpose of the invention is to provide an electrode adapted to give a light of a superior quality and with greater efficiency than the electrodes heretofore provided.

It has heretofore been proposed to make electrodes of mixtures of carbon and various minerals and in varying quantities upon the general theory that the presence of refractory materials with the carbon would result in increased light. I have found that such is the case where the mixtures are of the proper proportions; but so far as I am aware no sufficient directions have heretofore been given for guidance as to the materials to be used in conjunction nor their proportions, nor has sufficient consideration been given to the effects produced by varying quantities.

Generally speaking, it may be stated that the presence of a small quantity of mineral or refractory materials combined with the carbon of the electrodes will in operation produce a flickering or intermittent light, due to the occasional passage of particles of such refractory materials into or through the arc. If such refractory material is present in proportions less than ten per cent., then the effect is not only disagreeable by reason of its intermittent variations in luminosity, but also the efficiency of the arc is little, if at all, greater than that of the arc produced with pure-carbon electrodes. I have found, however, that with a proper mixture of carbon and certain mineral materials—such, for instance, as fluorid of calcium, in which the mineral material is present in a percentage greater than ten per cent.—the light efficiency is increased rapidly with each increment in the percentage of the mineral material until a very high percentage of such mineral material is reached. I have even obtained excellent results with electrodes in which the percentage of mineral material was as high as seventy or eighty per cent.; but below ten per cent. the results are in no sense satisfactory.

When proportions of mineral materials higher than ten per cent. are present, however, it is not possible to use numerous of the refractory compounds, because they form solid hard slags about the points of the electrodes, which interfere with the arc and also tend to yield an unsatisfactory color and lessen the efficiency. I have found that calcium fluorid will melt at or slightly below the temperature of the arc and either form in drops or vapors. The high chemical affinity between the fluorid and the calcium causes the calcium fluorid for the most part to remain undecomposed even in the temperature of the arc. Such vapors of the fluorid as may form and condense at the slightly colder edges of the carbon again become liquid and fall in drops, carrying with them any small particles of solid slag which may have been deposited by the metallic oxids. In this way the calcium fluorid acts not only as a means for increasing the light yielded by the arc, but also as a flux for the alkaline earths, so that a much larger percentage of such material as fluorid of calcium may be used or various other of the alkaline-earth compounds—such, for instance, as calcium carbonate—may be used. Moreover, the presence of the fluorin results in a warm, soft, yellowish red light, approximating the color of sunlight. I am enabled thus to obtain an arc of high light efficiency of agreeable color and very constant in its operation and electrodes which keep themselves free from accumulating slag. Fluorids of certain other metals or alkaline earths may be employed, provided they are selected with a view to producing the required fluid slag and flux.

In preparing my electrodes I make use of carbon prepared in the usual manner and mix with it the required amount of calcium fluorid, the best results being usually obtained with a mixture of from twenty to fifty per cent. of fluorids, larger proportions usually resulting in lessening too much the mechanical strength of the electrodes and also the temperature of the arc. Nevertheless, in some cases larger proportions may be employed, and considerably lower percentages may be employed, as already indicated.

To avoid porosity of the electrodes, the fluorids added to the carbon are usually calcined—that is to say, heated to such a temperature as to deprive them of the water of crystallization, but not sufficient to break up the chemical composition. I have found also that any tendency to flicker of an arc formed between such electrodes may be lessened by the addition of a quantity of the salts of boron or potassium or sodium—such, for instance, as boric acid, borax, potassium carbonate or silicate, or sodium carbonate or silicate. The presence of the fluorid compound serves as a flux for such ingredients. I have obtained excellent results from electrodes of good carbon intimately mixed with from twenty to seventy per cent. of calcium fluorid and from one to three per cent. of any one of the named salts of boron, potassium, or sodium. It will be understood, moreover, that these proportions may be varied within reasonable limits, and it will be further understood that while I have laid particular emphasis upon the flourid of calcium, yet good results may be obtained from other fluorids—such, for instance, as the fluorid of magnesia.

It will be understood that in constructing the electrode claimed herein the main purpose is to bring into coöperative association by any suitable process or arrangement the elements of the electrode in the proper proportions.

I claim as my invention—

1. A self-fluxing electrode for arc-lamps, consisting of an intimate mixture of carbon and a fluorin combined in a proportion of above ten per cent.

2. A self-fluxing electrode for arc-lamps composed of carbon and intimately mixed with a percentage of a fluorid of an alkaline earth in a proportion above ten per cent.

3. A self-fluxing electrode for arc-lamps consisting of a mixture of carbon and above ten per cent. of fluorid of calcium intimately mixed therewith.

4. A self-fluxing electrode for arc-lamps containing an intimate mixture of carbon and fluorid of an alkaline earth in excess of ten per cent. and from one to three per cent. of a compound of boron, potassium and sodium.

5. An electrode for arc-lamps composed of an intimate mixture of carbon and luminiferous fluorid in excess of ten per cent. and from one to three per cent. of calcined oxid or salt of boron, sodium or potassium.

6. A self-fluxing electrode for arc-lamps, consisting of carbon and a fluorin compound associated therewith in a proportion of above ten per cent.

In testimony whereof I have signed my name to this specification in the presence of two subscribing witnesses.

HUGO BREMER.

Witnesses:
HENRY HASPER,
WALDEMAR HAUPT.